United States Patent
Hendriks et al.

(10) Patent No.: US 10,204,415 B2
(45) Date of Patent: Feb. 12, 2019

(54) IMAGING APPARATUS

(71) Applicant: KONINKLIJKE PHILIPS N.V., Eindhoven (NL)

(72) Inventors: Bernardus Hendrikus Wilhelmus Hendriks, Eindhoven (NL); Theodoor Jacques Marie Ruers, Zeist (NL); Susanne Dorien Van Den Berg-Dams, Eindhoven (NL); Nicolaas Jan Noordhoek, Best (NL); Robert Johannes Frederik Homan, Batenburg (NL); Rami Nachabe, Eindhoven (NL); Gerhardus Wilhelmus Lucassen, Eindhoven (NL); Waltherus Cornelis Jozef Bierhoff, Veldhoven (NL); Marjolein Van Der Voort, Valkenswaard (NL)

(73) Assignee: Koninklijke Philips N.V., Eindhoven ( * ) Notice: Subject to any disclaimer, the term of this patent is extended or adjusted under 35 U.S.C. 154(b) by 0 days.

(21) Appl. No.: 14/372,286

(22) PCT Filed: Jan. 16, 2013

(86) PCT No.: PCT/IB2013/050385
§ 371 (c)(1),
(2) Date: Jul. 15, 2014

(87) PCT Pub. No.: WO2013/108182
PCT Pub. Date: Jul. 25, 2013

(65) Prior Publication Data
US 2014/0363063 A1 Dec. 11, 2014

Related U.S. Application Data

(60) Provisional application No. 61/586,860, filed on Jan. 16, 2012.

(51) Int. Cl.
*G06T 7/00* (2017.01)
*G06K 9/00* (2006.01)

(52) U.S. Cl.
CPC .......... *G06T 7/0014* (2013.01); *G06K 9/0014* (2013.01); *G06T 7/0016* (2013.01);
(Continued)

(58) Field of Classification Search
None
See application file for complete search history.

(56) References Cited

U.S. PATENT DOCUMENTS 6,671,540 B1 * 12/2003 Hochman ............ A61B 5/0059
600/431
7,043,063 B1 * 5/2006 Noble et al. .................. 382/128
(Continued)

FOREIGN PATENT DOCUMENTS

EP 2375988 A1 6/2010
JP 2006087601 A 4/2006
(Continued)

OTHER PUBLICATIONS

Docquier, Pierre-Louis, et al. "Computer-assisted resection and reconstruction of pelvic tumor sarcoma." Sarcoma 2010 (2010).*
(Continued)

*Primary Examiner* — Michelle M Hausmann

(57) ABSTRACT

The invention relates to an imaging apparatus (1). First and second image providing units (2, 9) provide a first image showing a region of an object, which includes a resection part to be resected, and a second image showing the region of the object, after the resection procedure has been performed, or showing a resected part, which has been resected. A smallest margin determination unit (13) determines a smallest margin region being a region where a margin between the resection part and the resected part is smallest
(Continued)

based on the first and second images. The smallest margin region is the region which most likely contains a part of the object, which should have been resected, like a cancerous part. An optionally following investigation of the resected part or of the remaining object can be more focused by considering this region, thereby allowing for faster corresponding assessing procedures.

17 Claims, 9 Drawing Sheets

(52) U.S. Cl.
CPC ............... *G06T 2207/10072* (2013.01); *G06T 2207/10132* (2013.01); *G06T 2207/20212* (2013.01); *G06T 2207/30024* (2013.01); *G06T 2207/30096* (2013.01)

(56) References Cited

U.S. PATENT DOCUMENTS

| | | | | |
|---|---|---|---|---|
| 7,079,674 | B2* | 7/2006 | Paragios et al. | 382/128 |
| 7,853,089 | B2* | 12/2010 | Shafirstein | G06K 9/0014 128/922 |
| 9,824,440 | B2* | 11/2017 | Mahadevan-Jansen | G06T 7/0012 |
| 2003/0053697 | A1* | 3/2003 | Aylward et al. | 382/203 |
| 2004/0199072 | A1* | 10/2004 | Sprouse | A61G 13/0081 600/424 |
| 2005/0000525 | A1* | 1/2005 | Klimberg | A61B 10/0233 128/898 |
| 2005/0004449 | A1* | 1/2005 | Mitschke et al. | 600/424 |
| 2005/0207529 | A1* | 9/2005 | Boese | G21K 4/00 378/41 |
| 2005/0234332 | A1* | 10/2005 | Murphy | A61B 5/4528 600/426 |
| 2005/0249391 | A1* | 11/2005 | Kimmel et al. | 382/128 |
| 2007/0025605 | A1* | 2/2007 | Bohm | G06T 5/50 382/128 |
| 2007/0255169 | A1 | 11/2007 | Hashimshony et al. | |
| 2007/0286469 | A1* | 12/2007 | Yamagata et al. | 382/131 |
| 2008/0039742 | A1* | 2/2008 | Hashimshony | A61B 5/0071 600/587 |
| 2008/0077158 | A1* | 3/2008 | Haider | A61B 17/14 606/130 |
| 2008/0123927 | A1* | 5/2008 | Miga | G06T 7/0032 382/131 |
| 2008/0178654 | A1* | 7/2008 | Hochmitz | A61B 5/061 73/1.85 |
| 2008/0269582 | A1* | 10/2008 | Mansour et al. | 600/357 |
| 2009/0088628 | A1* | 4/2009 | Klingenbeck-Regn | G06Q 50/22 600/424 |
| 2009/0177089 | A1* | 7/2009 | Govari | A61B 8/12 600/453 |
| 2010/0010343 | A1* | 1/2010 | Daghighian | A61B 6/037 600/436 |
| 2010/0063496 | A1* | 3/2010 | Trovato | G06T 7/0012 606/34 |
| 2010/0179522 | A1* | 7/2010 | Companion | A61B 18/22 606/10 |
| 2011/0021888 | A1* | 1/2011 | Sing | A61B 5/0507 600/302 |
| 2011/0026786 | A1 | 2/2011 | Mohamed | |
| 2011/0105895 | A1* | 5/2011 | Kornblau | A61B 34/20 600/426 |
| 2011/0176746 | A1* | 7/2011 | Bucki et al. | 382/293 |
| 2011/0235884 | A1* | 9/2011 | Schreibmann et al. | 382/131 |
| 2011/0274330 | A1* | 11/2011 | Mori | G06T 7/0016 382/131 |
| 2012/0053443 | A1* | 3/2012 | Sakuragi | 600/407 |
| 2012/0078088 | A1* | 3/2012 | Whitestone | A61B 5/441 600/425 |
| 2012/0209526 | A1* | 8/2012 | Imhof | 702/5 |
| 2012/0299591 | A1* | 11/2012 | Golan | G01R 33/30 324/309 |
| 2013/0023867 | A1* | 1/2013 | Collins | A61B 18/1206 606/33 |

FOREIGN PATENT DOCUMENTS

| | | | |
|---|---|---|---|
| JP | 2010187731 A | 9/2010 | |
| JP | 2010274043 A | 12/2010 | |
| WO | 2011094659 A2 | 8/2011 | |
| WO | 2011145037 A1 | 11/2011 | |
| WO | WO 2015035178 A2 * | 3/2015 | ............. A61B 5/066 |
| WO | WO 2016201341 A1 * | 12/2016 | ............. A61B 34/10 |

OTHER PUBLICATIONS

Kneissler, M., et al. "Concept and clinical evaluation of navigated control in spine surgery." Advanced Intelligent Mechatronics, 2003. AIM 2003. Proceedings. 2003 IEEE/ASME International Conference on. vol. 2. IEEE, 2003.*

Lim, Hoon, et al. "Image-guided robotic mastoidectomy using human-robot collaboration control." Mechatronics and Automation (ICMA), 2011 International Conference on. IEEE, 2011.*

Zhang, Zeshu, et al. "A wearable Goggle navigation system for dual-mode optical and ultrasound localization of suspicious lesions: validation studies using tissue-simulating phantoms and an ex vivo human breast tissue model." PloS one 11.7 (2016): e0157854.*

Xiong, L. et al. "Deformable structure registration of bladder through surface mapping". Medical Physics, vol. 33, Issue 6, pp. 1848-1856 (2006).

Nachabe, R. et al. "Estimation of lipid and water concentrations in scattering media with diffuse optical spectroscopy from 900 to 1600 nm". Journal of Biomedical Optics, vol. 15, pp. 37015-1 to 37015-10 (2010).

Nachabe, R. et al. "Estimation of biological chromophores using diffuse reflectance spectroscopy: benefit of extending the UV-VIS wavelength range to include 1000 to 1600 nm". Biomedical Optics Express, vol. 18, pp. 1432-1442 (2010).

Nachabe, R. et al. "Effect of bile absorption coefficients on the estimation of liver tissue optical properties and related implications in discriminating healthy and tumorous samples". Biomedical Optics Express, volumber 2 pp. 600-614 (2011).

Chen, D-R et al. "Three-dimensional ultrasound in margin evaluation for breast tumor excision using Mammotome (R)". Ultrasound in Medicine and Biology, New York, NY, vol. 30, No. 1, (2004) pp. 169-179.

* cited by examiner

IMAGING APPARATUS

This application is a national stage application under 35 U.S.C. §371 of International Application No. PCT/IB2013/050385 filed on Jan. 16, 2013 and published in the English language on Jul. 25, 2013 as International Publication No. WO/2013/108182, which claims priority to U.S. Application No. 61/586,860 filed on Jan. 16, 2012, the entire disclosures of which are incorporated herein by reference.

FIELD OF THE INVENTION

The invention relates to an imaging apparatus, an imaging method and an imaging computer program. The invention relates further to a resection apparatus, a resection method and a resection computer program for performing a resection procedure.

BACKGROUND OF THE INVENTION

WO 2011/094659 A2 discloses an imaging system for margin assessment of an ex vivo tissue sample. The imaging system comprises an imaging scanner controlled by an imaging control unit and an ex vivo sample holder for holding the ex vivo tissue sample. The sample holder is sized such that excised lump edges of the ex vivo tissue sample are forced against a surface of the sample holder such that the edges change shape to a predetermined geometry. The imaging scanner is positioned relative to the sample holder such that the imaging scanner acquires images not of all the tissue, but rather of the edges that have the predetermined geometry and which are in a sensitive region extending into a peripheral margin of the tissue. This kind of assessing the margin of an ex vivo tissue sample requires several time consuming steps such that the overall assessing procedure takes a relatively long time.

SUMMARY OF THE INVENTION

It is regarded as being an object of the present invention to provide an imaging apparatus, an imaging method and an imaging computer program, which allow assessing an object faster. It is a further object of the present invention to provide a resection apparatus, a resection method and a resection computer program for performing a resection procedure depending on the assessing result.

In a first aspect of the present invention an imaging apparatus is presented, wherein the imaging apparatus comprises:
- a first image providing unit for providing a first image showing a region of an object, which includes a resection part to be resected by a first resection procedure,
- a second image providing unit for providing a second image showing the region of the object, after the first resection procedure has been performed, or showing a resected part, which has been resected, of the object,
- a registration unit for registering the first image and the second image with respect to each other, and
- a smallest margin determination unit for determining a smallest margin region being a region where a margin between the resection part and the resected part is smallest based on the registered first and second images.

Since the first image shows a region of an object, which includes a resection part to be resected, since the second image shows the region of the object, after the first resection procedure has been performed, or shows a resected part, which has been resected, since the first image and the second image are registered with respect to each other and since a smallest margin region is determined as being a region, where a margin between the resection part and the resected part is smallest based on the registered first and second images, a smallest margin region, which can be suspicious of containing a part of the object, which should have been resected, can relatively fast be determined by just registering two images and applying relatively simple image analysis to these registered images.

Moreover, since the smallest margin region has been determined based on the registered first and second images, the location of the smallest margin region relative to the object, from which the resected part has been resected, is known, i.e. although the resected part has been separated from the object, the spatial relation between the resected part and the object is still known.

Furthermore, since the resection part, which can be a segmented tumor, is shown in the first image, the second image does not need to show the resection part. In particular, the second image just needs to show the outer border of the resected part or the border of a resection opening being present, after the first resection procedure has been performed. Thus, the second image providing unit can provide a lower quality image, without diminishing the quality of assessing the object.

The object is preferentially biological tissue and the resection part is preferentially a cancerous part of the tissue. The resected part is the part of the tissue, which has actually been resected and which is supposed to be larger than the resection part because of a safety margin around the resection part. The smallest margin region can therefore indicate a suspicious region, in which cancerous tissue may be present.

The first image providing unit is preferentially adapted to provide a two- or three-dimensional image, in which the resection part is segmented. The second image providing unit is preferentially adapted to provide a two- or three-dimensional image of the object, after the first resection procedure has been performed, or showing a resected part, which has been resected. For instance, the first image and/or the second image can be a computed tomography image, a magnetic resonance image, a nuclear image like a positron emission tomography image or a single photon emission computed tomography image, an ultrasound image or an image generated by another imaging modality. In an embodiment, the first image is a three-dimensional computed tomography image and the second image is a three-dimensional ultrasound image.

The first resection procedure can be, for instance, an open surgery procedure or a minimally invasive surgery procedure.

The registration results preferentially in a combination image showing, for example, the resected part and the resection part, wherein the smallest margin determination unit is adapted to determine the smallest margin based on the combination image.

The registration unit can be adapted to perform a deformable registration. In particular, the first image providing unit can be adapted to provide a three-dimensional first image, the second image providing unit can be adapted to provide a three-dimensional second image, and the registration unit can be adapted to perform the deformable registration under the consideration that the volume of corresponding elements in the first and second images is the same. For example, in an embodiment, the first image shows a tumor to be resected, wherein the tumor region defines the resection part, the second image can show the resected part including the tumor region. The deformable registration can then be performed under the assumption that the tumor regions in the first and second images have the same volume. Or, landmarks detectable in both images can define corresponding three-dimensional areas in the first and second images, wherein the deformable registration can be performed under the assumption that the corresponding three-dimensional areas have the same volume. The landmarks can be natural landmarks or they can be artificial landmarks, which can be attached to the part, which will be resected, before the first resection procedure is performed. This allows providing a high-quality registration, even if the object, from which the resected part has been resected, and the resected part are deformed.

It is preferred that the first image providing unit is adapted to provide the first image such that an outer border of the resection part is detectable, the second image providing unit is adapted to provide the second image such that an outer border of the resected part is detectable, and the smallest margin determination unit is adapted to determine the smallest margin region by determining the margin between the outer border of the resection part and the outer border of the resected part and by determining the region, where the determined margin is smallest, as smallest margin region. This allows determining the smallest margin region with relatively low computational efforts, thereby further increasing the speed of assessing the object.

The imaging apparatus preferably comprises a display unit for displaying the determined smallest margin region. In particular, the display unit is adapted to show the smallest margin region in at least one of the first and second images. For instance, arrows can be shown, which point onto the smallest margin region. Alternatively or in addition, color coding or another technique for highlighting the smallest margin region can be used. This allows indicating the smallest margin region with respect to the object, from which the resected part has been resected, and/or with respect to the resected part. The position of the smallest margin region, which is preferably a region being suspicious of containing cancerous tissue, can therefore accurately and easily be identified in the resected object and/or the resected part, which has been separated from the object.

In a preferred embodiment, the imaging apparatus further comprises an object type determination device for probing a part of the object being defined by at least one of the smallest margin region and an adjacent region, wherein the adjacent region was adjacent to the smallest margin region before the first resection procedure has been performed, wherein the object type determination device is adapted to determine the type of the object in the probed part. In particular the object is biological tissue, wherein the object type determination device is adapted to determine whether the biological tissue is cancerous in the probed part. Since the smallest margin region is the region most likely containing cancerous tissue, it is not necessary to investigate, for example, the entire resected part, but the investigation can be limited to the smallest margin region, thereby reducing the determination efforts needed for determining whether the biological tissue is cancerous or not. Moreover, since the position of the smallest margin region is known with respect to the object, from which the resected part has been separated, and with respect to the resected part, the location of the cancerous region is accurately known and can be shown on the display unit.

The object type determination device can be adapted to probe the resected part, for instance, a resected specimen, i.e. to probe the smallest margin region in the specimen, or it can be adapted to probe the tissue in the person, which was adjacent to the resected specimen and which therefore could be suspicious. A display unit preferentially highlights the probed part, if it has been determined that the probed part comprises cancerous tissue. In particular, the display unit can be adapted to highlight the cancerous probed part, for example, by showing the cancerous area with a certain color.

The object type determination device is preferentially adapted to optically probe the part of the object. In a preferred embodiment, the object type determination device and the second image providing unit are integrated forming an integrated unit such that the integrated unit is adapted to provide the second image and to probe the part of the object being defined by at least one of the smallest margin region and the adjacent region. This allows determining the smallest margin region without needing a separate second image providing unit like a separate ultrasound imaging unit.

The smallest margin region determination unit can be further adapted to provide a margin threshold and to determine further regions, where the margin between the resection part and the resected part is smaller than the provided margin threshold. The margin threshold may be provided depending on the kind, in particular, the tissue type, of the resection part. For instance, if the resection part is a breast tumor, the provided margin threshold may be about 2 mm. If the resection part is a lung tumor, the margin threshold may be equal to the size of the lung tumor, i.e. for a lung tumor having a diameter of 1 cm the margin threshold is preferentially about 1 cm. Also these further regions can be shown on a display unit and they can be probed by an object type determination device. In particular, it can be determined whether these further regions contain cancerous tissue or not and, if they contain cancerous tissue, also these further regions can be highlighted on the display unit.

In a further aspect of the present invention a resection apparatus for performing a resection procedure is presented, wherein the resection apparatus comprises:

an imaging apparatus as defined in claim 1, an object type determination device for probing a part of the object being defined by at least one of the smallest margin region and an adjacent region, wherein the adjacent region was adjacent to the smallest margin region before a first resection procedure has been performed, wherein the object type determination device is adapted to determine the type of the object in the probed part, and a resection device for resecting the adjacent region in a second resection procedure depending on the determined type of the object in the probed part.

It is further preferred that the object is biological tissue, wherein the object type determination unit is adapted to determine whether the biological tissue is cancerous in the probed part, wherein the resection device is adapted to resect the adjacent region, if it has been determined that the probed part comprises cancerous tissue. In this way, it can be ensured that cancerous tissue is completely resected.

It is also preferred that the object determination unit and the resection device are integrated into an integrated device such that the integrated device is adapted to probe a part of the object defined by the adjacent region, and to resect the adjacent region, if it has been determined that the probed part comprises cancerous tissue. Moreover, in an embodiment also the second image providing unit can be integrated into the resection device.

In a further aspect of the present invention an imaging method is presented, wherein the imaging method comprises:
  providing a first image showing a region of an object, which includes a resection part to be resected by a first resection procedure, by a first image providing unit,
  providing a second image showing the region of the object, after the first resection procedure has been performed, or showing a resected part, which has been resected, of the object, by a second image providing unit,
  registering the first image and the second image with respect to each other by a registration unit, and
  determining a smallest margin region being a region where a margin between the resection part and the resected part is smallest based on the registered first and second images, by a smallest margin determination unit.

In a further aspect of the present invention a resection method for performing a resection procedure is presented, wherein the resection method comprises:
  imaging as defined in claim 12,
  probing a part of the object being defined by at least one of the smallest margin region and an adjacent region by an object type determination device, wherein the adjacent region was adjacent to the smallest margin region before a first resection procedure has been performed, wherein the object type determination device determines the type of the object in the probed part, and
  resecting the adjacent region in a second resection procedure depending on the determined type of the object in the probed part by a resection device.

In a further aspect of the present invention an imaging computer program is presented, wherein the imaging computer program comprises program code means for causing an imaging apparatus as defined in claim 1 to carry out the steps of the imaging method as defined in claim 12, when the imaging computer program is run on a computer controlling the imaging apparatus.

In a further aspect of the present invention a resection computer program for performing a resection procedure is presented, wherein the resection computer program comprises program code means for causing a resection apparatus as defined in claim 9 to carry out the steps of the resection method as defined in claim 13, when the resection computer program is run on a computer controlling the resection apparatus.

It shall be understood that the imaging apparatus of claim 1, the resection apparatus of claim 9, the imaging method of claim 12, the resection method of claim 13, the imaging computer program of claim 14, and the resection computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

BRIEF DESCRIPTION OF THE DRAWINGS

In the following drawings.

DETAILED DESCRIPTION OF EMBODIMENTS

Figure 1:
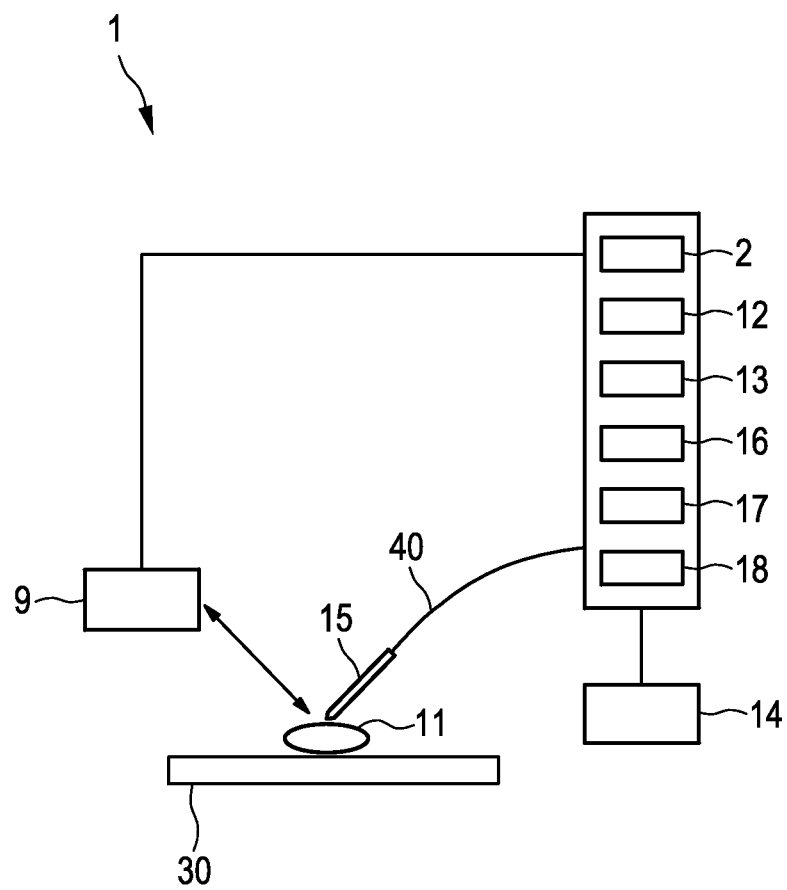
FIG. 1 shows schematically and exemplarily an embodiment of an imaging apparatus.

FIG. 1 shows schematically and exemplarily an imaging apparatus 1 comprising a first image providing unit 2 for providing a first image showing a region of an object, which includes a resection part to be resected by a first resection procedure. The first image providing unit 2 is, in this embodiment, a storing unit, in which the first image is stored and from which the first image can be retrieved for providing the same. In another embodiment, the first image providing unit can also be a receiving unit for receiving the first image via a wireless or wired data connection and for providing the received first image. Moreover, in a further embodiment, the first image providing unit can be an imaging system for generating the first image and for providing the generated first image. The first image is preferentially a pre-interventional image, which has been acquired before performing a first resection procedure. The first image can be a two-dimensional image or a three-dimensional image showing the region of the object, which includes the resection part to be resected by the first resection procedure. The first image is, for example, a computed tomography image, a magnetic resonance image, a nuclear image like a positron emission tomography image or a single photon emission computed tomography image, an ultrasound image or an image of another imaging modality. In this embodiment, the first image is a three-dimensional computed tomography image, which is schematically and exemplarily shown in FIG. 2.

Figure 2:
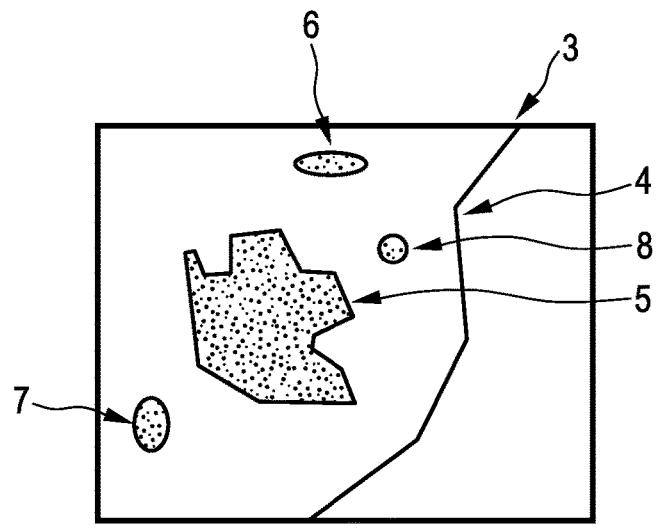
FIG. 2 shows schematically and exemplarily a first image showing a region of an object, which includes a resection part to be resected.

In this embodiment, the object is a person, in particular, biological tissue of the person, and the resection part to be resected is a cancerous part of the tissue. FIG. 2 shows a first image 3 being a pre-operative or pre-interventional image containing a region 4 of the biological tissue, which includes a tumor 5 to be resected, wherein the tumor 5 is the resection part. The first image shows further elements 6, 7, 8, which do not need to be resected. The first image 3 is provided such that the outer border of the resection part 5 is detectable in the first image by, for instance, known segmentation techniques, which may be, for example, based on the intensity values of the first image, expected shapes of the tumor, et cetera.

The imaging apparatus 1 further comprises a second image providing 9 for providing a second image showing the resected part 11, which has been resected by performing the resection procedure, of the object. In this embodiment, the resected part 11 is a biological sample or specimen of the person, which has been resected from the person by performing a first resection procedure and which is located on a table 30. The first resection procedure has been performed with a safety margin around the resection part, i.e. around the tumor, such that the resected part 11, i.e. the resected biological sample, is supposed to be larger than the resection part 5, i.e. supposed to be larger than the tumor.

Figure 3:
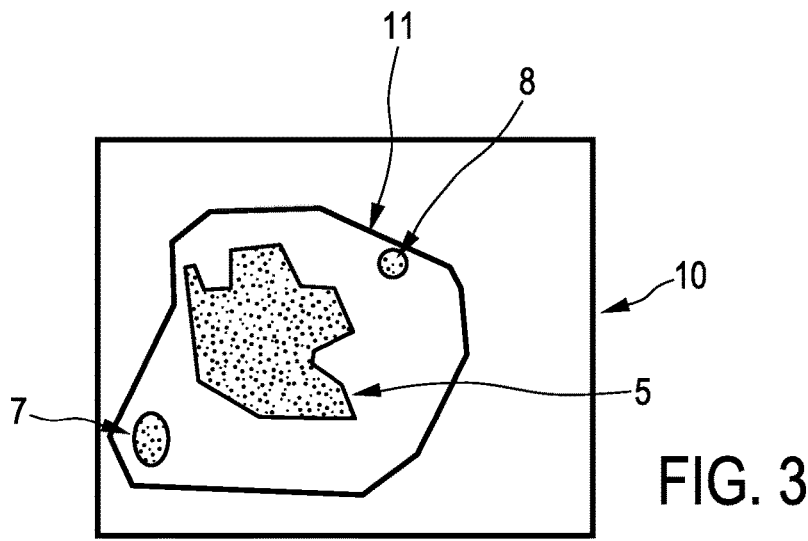
FIG. 3 shows schematically and exemplarily a second image showing a resected part, which has been resected.

Also the second image providing unit can be a storing unit, in which the second image is stored already and from which the second image can be retrieved for providing the same, or the second image providing unit can be a receiving unit for receiving the second image via a wireless or wired data connection and for providing the received second image. However, in this embodiment the second image providing unit 9 is an image acquisition system for acquiring a three-dimensional ultrasound image of the resected part 11. The three-dimensional ultrasound image is acquired such that the outer border of the resected part 11 is detectable. In other embodiments, the second image providing unit can be adapted to provide another kind of image, which can be provided by another imaging modality like a computed tomography imaging system, a C-arm imaging system, a magnetic resonance imaging system, a nuclear imaging system, et cetera. The second image is schematically and exemplarily illustrated in FIG. 3, where the resected part 11 including the resection part 5, i.e., including the tumor region 5, is shown. It should be noted that in FIG. 3 the resection part 5 is shown only for illustrating that the resection part 5 is within the resected part 11, but that the resection part 5 does not need to be detectable in the second image. The second image just needs to provide the outer border of the resected part 11.

The imaging apparatus 1 further comprises a registration unit 12 for registering the first image 3 and the second image 10 with respect to each other. In this embodiment, the registration unit 12 is adapted to perform a deformable registration under the consideration that the volumes of corresponding elements in the first and second images 3, 10 remain unchanged, i.e. the shape of the corresponding elements may change, but their volume content remains unchanged. In particular, the registration unit 12 can be adapted to detect corresponding landmarks in both images for defining corresponding three-dimensional areas in the first and second images, wherein the deformable registration can be performed under the assumption that the corresponding three-dimensional areas have the same volume. The landmarks can be natural landmarks or they can be artificial landmarks, which can be attached to the part, which will be resected, before the first resection procedure is performed.

The registration unit 12 can be adapted to use the registration algorithm disclosed in the article "Deformable structure registration of bladder through surface mapping" by L. Xiong et al., Medical Physics, volume 33, Issue 6, pages 1848 to 1856 (2006), which is herewith incorporated by reference. However, the registration unit can also be adapted to perform other known deformable registration methods.

Figure 4:
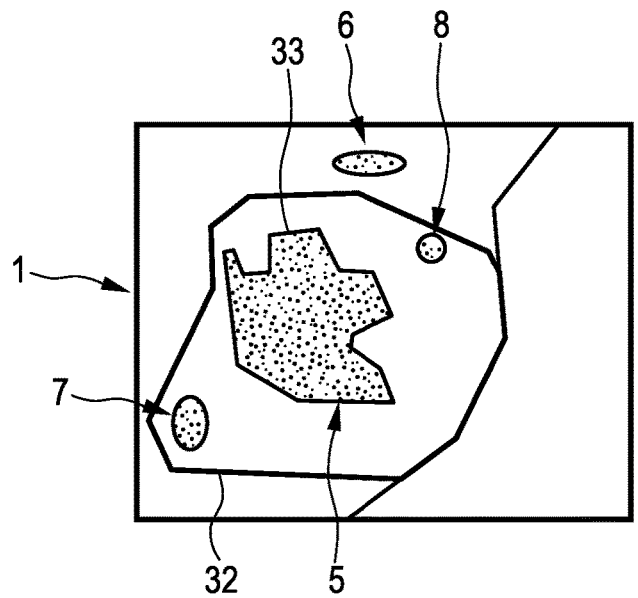
FIG. 4 shows schematically and exemplarily a combination image showing an outer boundary of the resected part overlayed on the first image.

After the registration procedure has been performed, the position of the outer border of the resected part 11 is known relative to the resection part 5 shown in the first image 3. The registration result can be illustrated in a combination image schematically and exemplarily shown in FIG. 4. The combination image 31 shows the outer border 32 of the resected part 11 within the first image showing—inter alia—the resection part 5.

The imaging apparatus 1 further comprises a smallest margin determination unit 13 for determining a smallest margin region being a region, where a margin between the resection part 5 and the resected part 11 is smallest based on the registered first and second images 3, 10. In particular, the smallest margin determination unit 13 can be adapted to determine the margin between the outer border 33 of the resection part 5 and the outer border 32 of the resected part 11 and to determine the region, where the determined margin is smallest, as the smallest margin region. For determining the margin, the smallest margin determination unit 13 can be adapted to segment the outer border of the resected part 11, if this segmentation has not already been performed. Moreover, the smallest margin determination unit 13 can be adapted to determine the margin based on the combination image, which shows the outer border 32 of the resected part 11 within the first image showing the resection part 5.

The smallest margin region can be a point, a one-dimensional line, a two-dimensional area or a three-dimensional volume.

The smallest margin region determination unit 13 can be adapted to determine the smallest margin region by, for example, determining a set of shortest connection lines connecting a respective point on an inner border of the respective margin with the closest point on an outer border of the margin or vice versa. These shortest connection lines can be determined for each point on the inner border or on the outer border, respectively. The smallest one of this set of shortest connection lines can define the smallest margin region, wherein in this case the smallest margin region is a one-dimensional line. If the outer border and the inner border contact each other at a contact point, the smallest margin region may be a point defined by the contact point.

The smallest margin region determination unit 13 can also be adapted to determine a two- or three-dimensional smallest margin region, for example, by thresholding the shortest connection lines. For instance, the smallest margin region can be determined such that it includes the smallest shortest connection line and further shortest connection lines in the vicinity of the smallest shortest connection line which are smaller than a threshold. This threshold can be predefined or it can be defined as being dependent on the length of the shortest connection line. For instance, the threshold can be defined by multiplying the smallest shortest connection line with a predefined factor being larger than one, wherein the factor can be predetermined by calibration measurements such that it includes with a desired high probability cancerous tissue completely, if present.

The smallest margin region determination unit 13 can also be adapted to determine the smallest margin region in another way. For instance, the inner or outer border of the margin can be subdivided into one- or two-dimensional subregions having a fixed predefined size. For each of these subregions a two-dimensional or three-dimensional determination region can be determined, which may be defined by i) the respective subregion on the inner or outer border, respectively, of the margin and ii) lines or surfaces being normal to the inner or outer border of the margin, respectively, and connecting the edges of the respective subregion with the other of the inner and outer border, respectively. Thus, the smallest margin region determination unit can be adapted to determine a set of two-dimensional or three-dimensional determination regions and to determine the smallest margin region as being the smallest one of the determination regions. The predefined fixed size of the subregions can be predefined by calibration measurements, wherein the size of the subregions can be determined such that the resulting smallest margin region includes, for instance, cancerous tissue, if present, with a desired high probability.

Figure 5:
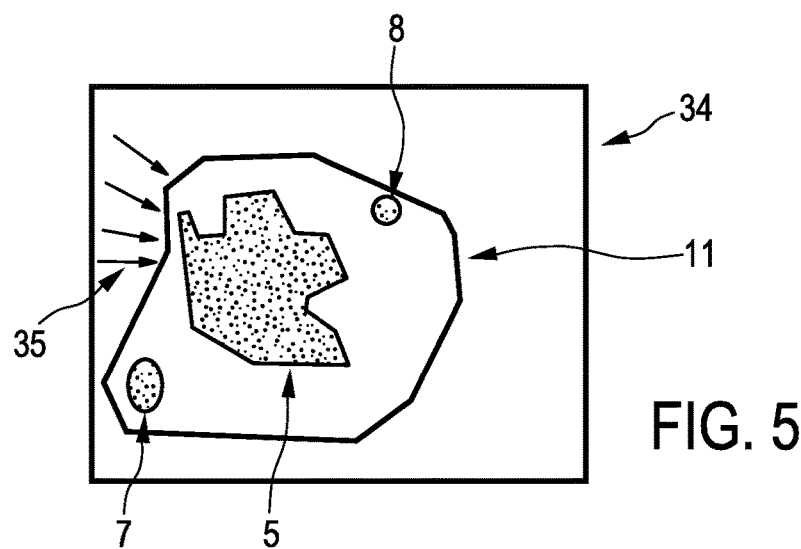
FIG. 5 shows schematically and exemplarily the second image, wherein a suspicious region is indicated by arrows.

The imaging apparatus 1 further comprises a display unit 14 for displaying the determined smallest margin region. For instance, as shown in FIG. 5, the display unit 14 can display an image 34 showing the resected part 11 and arrows 35, which point onto the smallest margin region, in order to indicate the smallest margin region. Alternatively or in addition, color coding or another technique can be used for highlighting the smallest margin region on the display unit 14.

It should be noted that the resection part 5 is clearly distinguishably shown in these figures for illustrative purposes only. Generally, the outer border of the resection part 5 cannot be detected in the three-dimensional ultrasound images shown in FIGS. 3 and 5. The smallest margin region can nevertheless be determined, because of the detectable outer border of the resection part 5 in the registered three-dimensional computed tomography image being, in this embodiment, the first image.

The imaging apparatus further comprises an object type determination device 15 . . . 18 for probing a part of the object being defined by the smallest margin region and for determining the type of the object in the probed part. In this embodiment, the object type determination device 15 . . . 18 is adapted to determine, whether the biological tissue is cancerous in the probed part or not. The display unit 14 can be adapted to highlight the smallest margin region, if the object type determination device 15 . . . 18 has determined that the smallest margin region is cancerous. For instance, the smallest margin region can be colored, for instance, it can be shown in red on the display unit 14, if it has been determined that the smallest margin region is cancerous. In this embodiment, the object type determination device 15 . . . 18 is adapted to optically probe the smallest margin region.

The object type determination device 15 . . . 18 comprises a radiation providing unit 16 for providing radiation, which is guided via a connection element 40 like a cable to a probe 15. Preferentially, the connection element 40 and the probe 15 comprise optical fibers for guiding the radiation generated by the radiation providing unit 16 to the tip of the probe 15, where the radiation can leave the probe 15 through openings. Radiation from the probed part, i.e. radiation, which has been influenced by the probed part by, for example, reflection, absorption and/or scattering, is collected by openings at the tip of the probe 15 and guided to a radiation detection unit 17 via optical fibers within the probe 15 and within the connection element 40. The radiation detection unit 17 is adapted to determine a spectrum of the collected radiation and to provide the determined spectrum to a tissue-type determination unit 18. The tissue-type determination unit 18 is adapted to determine the type of tissue within the probe part based on the detected spectrum. In particular, the determined spectrum can be compared with known spectra of different types of tissue, wherein the type of tissue of the probed part can be determined based on this comparison. In this embodiment, the tissue-type determination unit 18 is adapted to determine, whether the probed part contains cancerous tissue or not. The probe 15 with the connection element 40, the radiation providing unit 16, the radiation detection unit 17 and the tissue-type determination unit 18 form, in this embodiment, the object type determination device.

Figure 6:
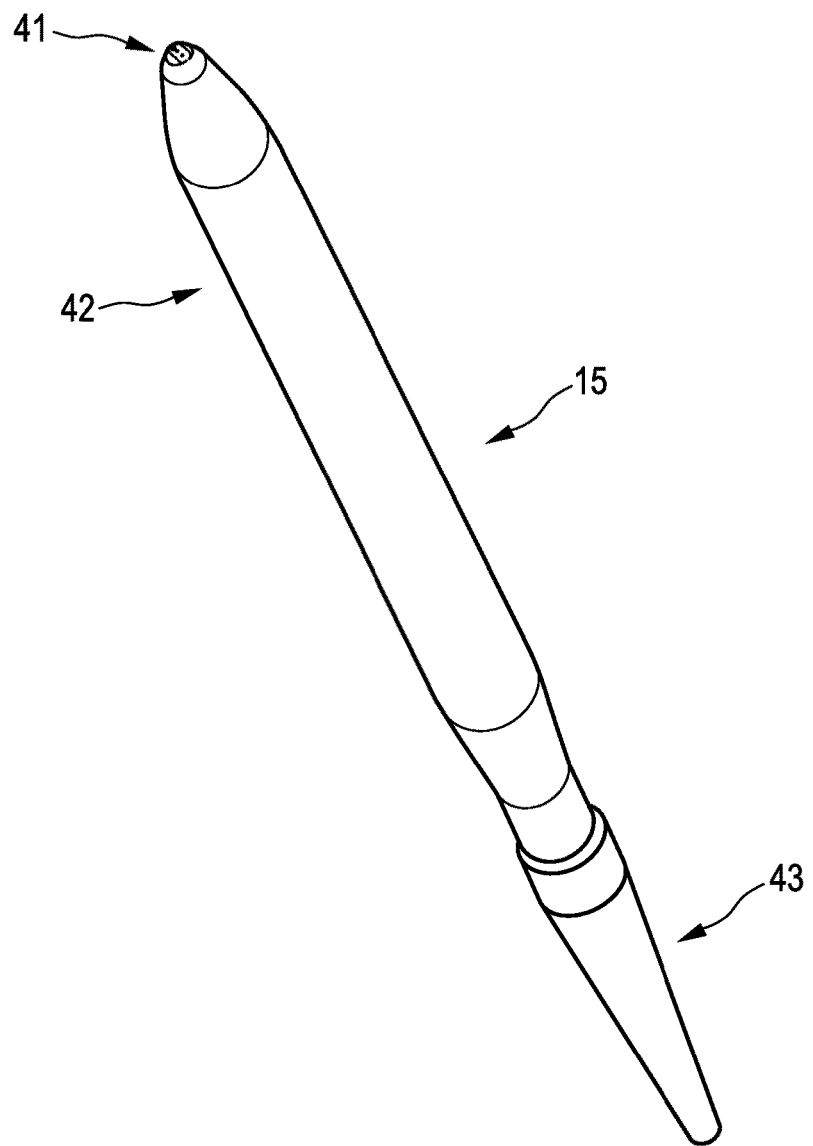
FIG. 6 shows schematically and exemplarily a probe of an object type determination device.

FIG. 6 shows schematically and exemplarily the probe 15 in more detail. The probe 15 comprises a tip 41, which is preferentially made of stainless steel, a holding part 42, which can be held by a user while performing the probing procedure, and a connector 43 for connecting to the connection element 40. The holding part 42 can be an aluminum holder, which may be opalized. The connector 43 can be a subminiature version A (SMA) connector boot.

Figure 7:
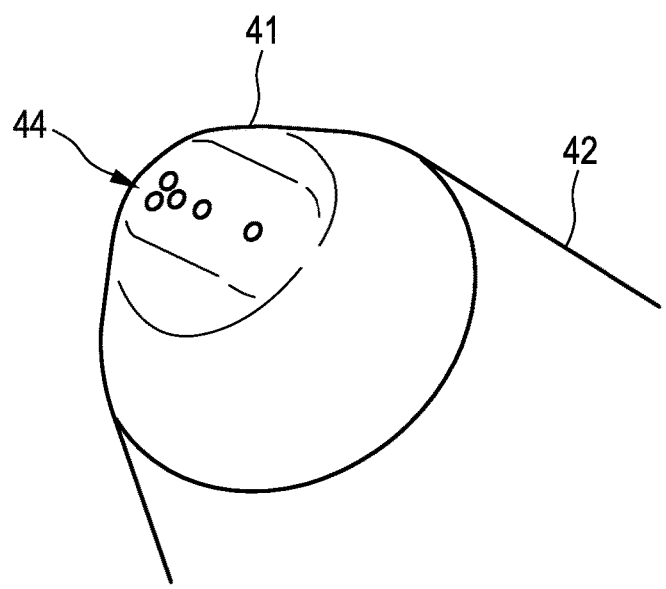
FIG. 7 shows schematically and exemplarily a tip of the probe.

FIG. 7 shows the tip 41 of the probe 15 in more detail. The tip 41 comprises several openings 44 for allowing radiation from the radiation providing unit 16 to leave the tip 41 and for allowing radiation, which has been influenced by the resected part 11, to be collected, wherein the collected radiation is guided via optical fibers to the radiation detection unit 17.

The object type determination device 15 . . . 18 can be adapted as described in the articles "Estimation of lipid and water concentrations in scattering media with diffuse optical spectroscopy from 900 to 1600 nm" by R. Nachabé et. al, Journal of Biomedical Optics, volume 15, pages 37015-1 to 37015-10 (2010), "Estimation of biological chromophores using diffuse optical spectroscopy: benefit of extending the UV-VIS wavelength range to include 1000 to 1600 nm" by Rami Nachabé et. al., Biomedical Optics Express, volume 18, pages 1432 to 1442 (2010), and "Effect of bile absorption coefficients on the estimation of liver tissue optical properties and related implications in discriminating healthy and tumorous samples" by R. Nachabé et al., Biomedical Optics Express, volume 2, pages 600 to 614 (2011), which are herewith incorporated by reference. In particular, the object type determination device 15 . . . 18 can be adapted to perform diffuse reflectance measurements, wherein the radiation detection unit 17 provides wavelength selectivity, for instance, by determining a spectrum of the collected radiation, i.e., a spectrum of the detected light. Alternatively or in addition, also the radiation providing unit 16, which is a light source, can be adapted to provide the wavelength selectivity. In an embodiment, light can be coupled out of the distal tip 41 of the probe 15 through at least on optical fiber, wherein the wavelength can be swept from, for instance, 500 to 1600 nm, while the light is collected by at least one detection fiber, i.e. at least one other optical fiber, which sends the collected light to a broadband detector of the radiation detection unit 17. Alternatively, broadband light can be provided by the radiation providing unit 16 via at least one source optical fiber, while the light collected by at least one detection optical fiber is sent to a wavelength selective detector, for instance, a spectrometer, of the radiation detection unit 17. For more details regarding the diffuse reflectance measurements reference is made to the above mentioned articles.

In addition to or alternatively, the object type determination unit can be adapted to perform fluorescence measurements. In this case, the radiation providing unit is adapted to provide excitation light to the tip of the probe via at least one source optical fiber, while fluorescence light generated by the probed part, in particular, by the probed tissue, is collected by one or more detection optical fibers and guided to the radiation detection unit. The radiation providing unit can comprise a laser like a semiconductor laser, a light-emitting diode or a filtered light source like a filtered mercury lamp. Preferentially, the light used for performing the fluorescence measurements has wavelengths being smaller than the wavelengths of the fluorescence light that is to be detected. The probe and/or the radiation detection unit can comprise a filter for filtering out excitation light, in order to avoid a possible overload of the radiation detection unit by the excitation light. Also in the case of fluorescence measurements, the radiation detection unit can be wavelength selective, i.e., can comprise, for instance, a spectrometer, in order to distinguish multiple fluorescent entities from each other.

For diffuse optical reflectance measurements the opening of a source optical fiber and the opening of a detector optical fiber have preferentially a distance being larger than the diameter of the optical fibers. In the case of fluorescence detection this distance is preferentially as small as possible.

If the object type determination device is adapted to combine fluorescence measurements with diffuse reflectance measurements, the radiation providing unit can be adapted to provide excitation light for measuring fluorescence and diffused reflectance light for performing the diffuse reflectance measurements. These two kinds of light can be provided through the same one or several source optical fiber for guiding the light to the distal tip of the probe. In order to provide these two types of light consecutively, the radiation detection unit can use a fiber switch, a beam splitter, a dicroic beam combiner with focusing optics, et cetera. Alternatively, separate optical fibers can be used for providing the fluorescence excitation light and for providing the light for the diffuse reflectance measurements.

The tissue-type determination unit can be adapted to determine whether the smallest margin region comprises tumor tissue or only normal tissue based on the diffuse reflectance spectroscopy and/or the fluorescence measurements as described above. In particular, the tissue-type determination unit can be adapted to compare characteristics of the detected radiation with characteristics, which are known to be connected with normal tissue or tumor tissue, and to determine, whether the smallest margin region contains normal tissue only or tumor tissue, based on these characteristics. In an embodiment, the tissue-type determination unit firstly determines physiological parameters of the tissue in the smallest margin region based on characteristics of the detected radiation by comparing the characteristics of the detected radiation, which characteristics, which are known to correspond to certain physiological parameters, wherein then the tissue-type determination unit determines the tissue-type based on known relations between a) normal and tumor tissue, and b) physiological parameters. This allows determining whether the suspicious area, i.e., the smallest margin region, is free of tumor tissue or not. In case there is still a tumor present, a surgeon can decide to further extend the resection area in the person.

The probe 15 is, in this embodiment, a photonic probe, which can be adapted to contact the outside of the smallest margin region, while performing the probing procedure. In another embodiment, the probe can be adapted, for example, to be introduced into the resected part 11 for determining the tissue-type, i.e. the photonic probe can be, for instance, a needle.

Although the object type determination unit has been described above as performing diffuse reflectance and/or fluorescence measurements for extracting tissue properties, in particular, for determining, whether the tissue is cancerous or not, in other embodiments the object type determination unit can also be adapted to perform other optical or non-optical methods for determining the object type. For instance, the object type determination unit can be adapted to perform diffuse optical tomography by employing a plurality of optical fibers, differential path lengths spectroscopy, Raman spectroscopy et cetera. Moreover, fluorescence measurements may not only be performed based on autofluorescence of the tissue, but fluorescence measurements can also be performed after corresponding contrast agents have been accumulated in the tissue to be probed. If the object type determination unit is adapted to perform a fluorescence measurement, which is, in particular, based on fluorescent contrast agents, the object type determination unit can also be adapted to generate a fluorescence image, which can be used as the second image. For instance, the radiation providing unit, the probe and the radiation detection unit can be the corresponding elements of the fluorescence imaging system provided the company SurgOptix, wherein the resulting fluorescence image can be used as the second image and can be used for determining whether the smallest margin region comprises tumor tissue or not. In this case, the object type determination device and the second image providing unit can be regarded as being integrated into a single integrated unit such that the integrated unit is adapted to provide the second image being, in this example, a fluorescence image and to probe the part of the object being defined by the smallest margin region. Thus, in this case, an additional separate second image providing unit like an ultrasound imaging unit may not necessarily be required.

Figure 8:
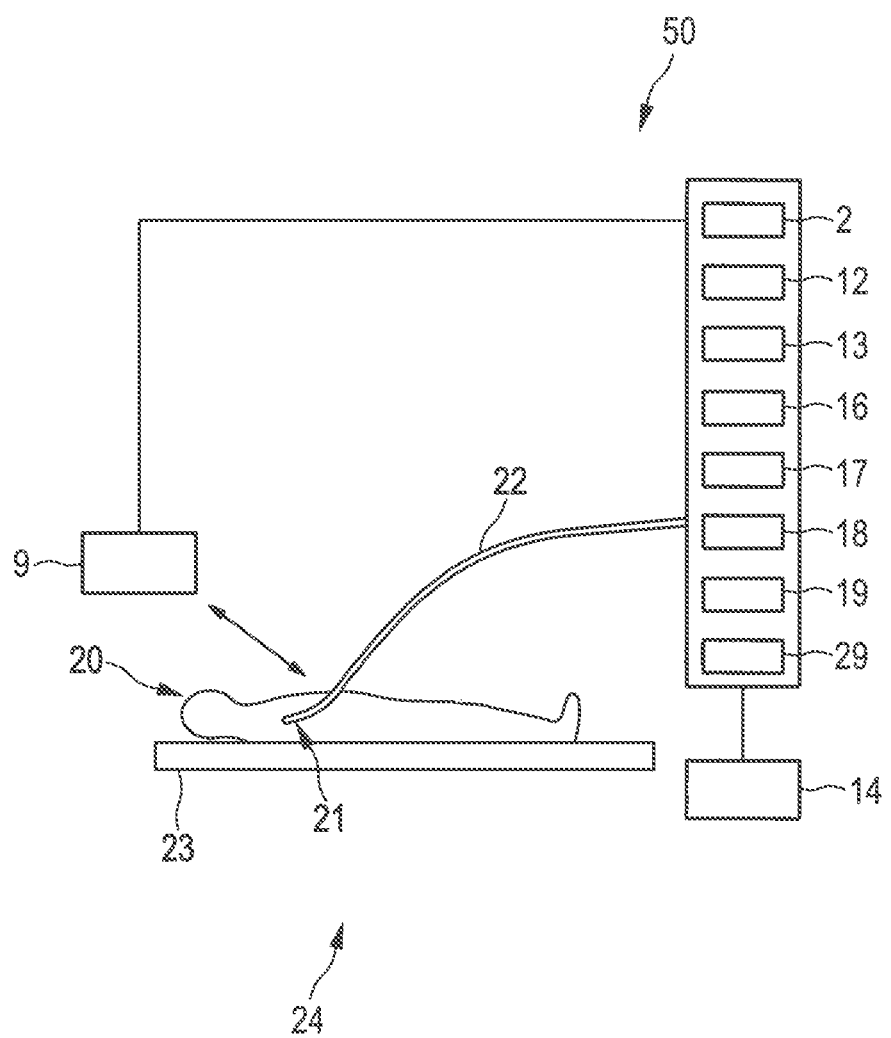
FIG. 8 shows schematically and exemplarily a resection apparatus for resecting an object.

FIG. 8 shows schematically and exemplarily an embodiment of a resection apparatus for performing a resection procedure. The resection apparatus 24 comprises an imaging apparatus 50 and a resection device 19, 22 for resecting an imaged part of the object.

The imaging apparatus 50 comprises a first image providing unit 2 being similar to the first image providing unit described above with reference to FIG. 1. In particular, also in this embodiment, the first image providing unit provides preferentially a three-dimensional computed tomography image, which is schematically and exemplarily shown in FIG. 2. The imaging apparatus 50 further comprises a second image providing unit 9 being—similar to the second image providing unit described above with reference to FIG. 1—an ultrasound image generation unit for generating a three-dimensional ultrasound image. However, in this embodiment, the provided second image shows the region of a person 20 lying on a table 23, which contained the resection part to be resected, within the person 20 after the first resection procedure has been performed. A corresponding second image is schematically and exemplarily shown in FIG. 9.

Figure 9:
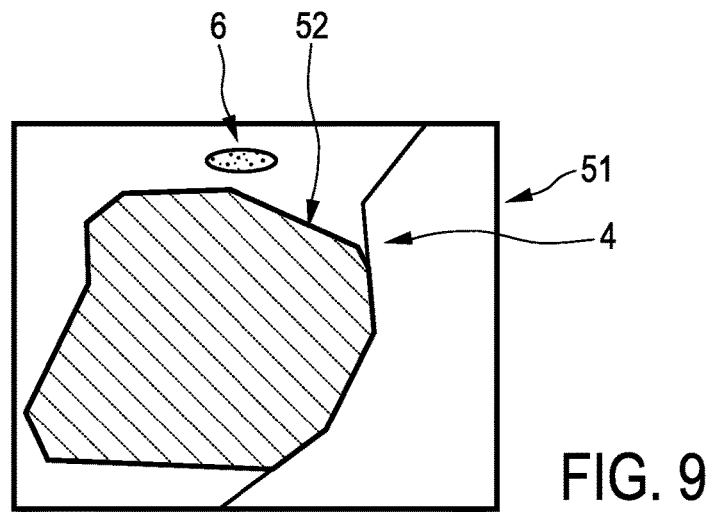
FIG. 9 shows schematically and exemplarily a second image showing the region of the object shown in the first image, after a first resection procedure has been performed.

FIG. 9 shows the second image 51 including the region 4, in which a resection opening 52 is present, after the resected part has been resected and separated from the person 20. In this embodiment, the second image 51 can be regarded as being an intra-operative image of the resection area. The imaging apparatus 50 further comprises a registration unit 12 for registering the first image 3 and the second image 51 with respect to each other, and a smallest margin determination unit 13 for determining a smallest margin region being a region, where a margin between the resection part 5 and the resected part 11, which is, in this embodiment, defined by the resection opening 52, is smallest based on the registered first and second images 3, 51. Also in this embodiment, the registration unit 12 can be adapted to perform a deformable registration, wherein it is assumed that corresponding volumes in the first and second images can be deformed, while the volume contents, for example, the cubic centimeter value, remains constant. The smallest margin determination unit 13 is preferentially adapted to determine the outer border of the resection opening 52 and, thus, the outer border of the resected part, and to determine the margin between the outer border of the resection part 5 and the outer border of the resected part 11 being defined by the outer border of the resection opening 52. The smallest margin determination unit 13 is preferentially further adapted to determine the region, where the determined margin is smallest, as the smallest margin region.

Figure 10:
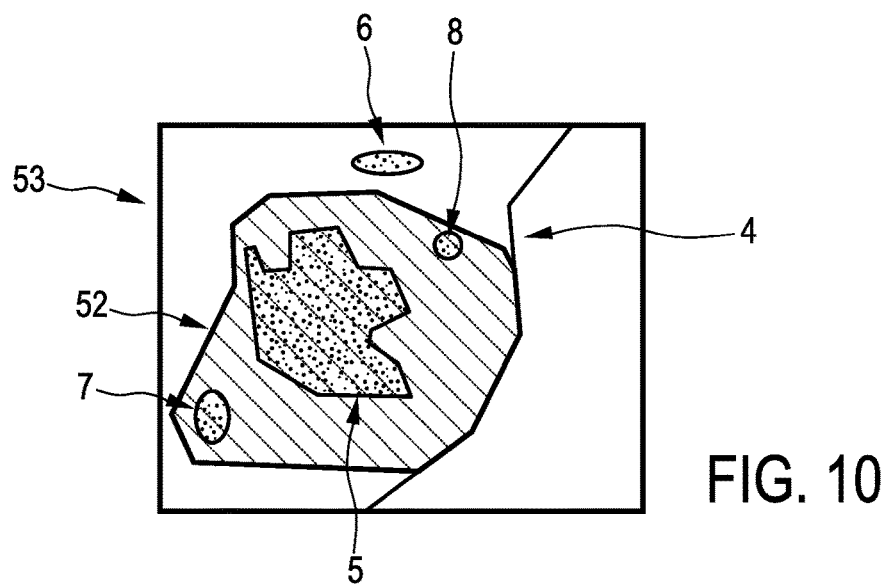
FIG. 10 shows schematically and exemplarily a resection opening shown in the second image overlayed on the first image.

The registration of the first and second images can result in a combination image, which is schematically and exemplarily shown in FIG. 10 and on which the determination of the smallest margin region can be based. In this embodiment, the combination image 53 shows the resection opening 52 overlayed on the first image 3.

The imaging apparatus 50 further comprises a display unit 14 being adapted to show the smallest margin region in at least one of the first and second images. In this embodiment, the smallest margin region is indicated by arrows 54 and the smallest margin region is shown in the first image, on which the resection opening 52 is overlayed for forming the combination image.

In this embodiment, the second image is an overview image of the area being operated, instead of being an image of a specimen taken out as described above with reference to FIGS. 1 to 5. Although in the embodiment described here with reference to FIG. 8 the second image providing unit is an ultrasound image generation unit, in other embodiments also other imaging units can be used for providing the second image. For instance, an overview image can also be provided by a video camera system. For instance, the video camera system disclosed in EP 2 375 988 can be used for providing the second image.

The imaging apparatus 50 further comprises a radiation providing unit 16, a radiation detection unit 17 and a tissue-type determination unit 18, which are similar to the corresponding units 16, 17, 19 described above with reference to FIG. 1 and which can be adapted, for instance, for determining whether probed tissue contains cancerous tissue or not based on a diffuse reflectance measurement and/or a fluorescence measurement. The radiation providing unit 16, the radiation detection unit 17 and the tissue-type determination unit 18 form together with a surgical tool 22 an object type determination device. The surgical tool 22 has integrated optical fibers for guiding light from the radiation providing unit 16 to the tip 21 of the surgical tool 22 for illuminating an adjacent region being adjacent to the determined smallest margin region within the person 20 through openings at the tip 21 and for guiding light, which has been influenced by the adjacent region and which has been collected through openings at the tip, to the radiation detection unit 17. The object type determination device 16 . . . 18, 22 allows therefore probing the tissue in vivo, whereas the object type determination device described above with reference to FIG. 1 allows probing the resected tissue ex vivo.

A surgical element like a surgical knife or another cutting device is integrated into the surgical tool 22, wherein the surgical element is controllable by a surgical element control unit 19. The surgical tool 22 with the surgical element and the surgical element control unit 19 form a resection device for resecting an imaged part of the person. The resection device is adapted to resect the adjacent region, if it has been determined that the adjacent region comprises cancerous tissue. In this embodiment, the probing device and the resection device are integrated into an integrated device such that the integrated device is adapted to probe a part of the object defined by the adjacent region being adjacent to the smallest margin region and to resect the probed part, if it has been determined that the probed part comprises cancerous tissue. In another embodiment, the probing device and the resection device can also be separate devices.

The tip 21 of the surgical tool 22 is preferentially tracked such that the position of the tip 21 is known within the person 20. The tracked location is shown to a surgeon within the overview image, i.e. within the first image or the combination image, in which the smallest margin region is marked, in order to allow the surgeon to guide the surgical tool 22 to a region within the person 20 being adjacent to the smallest margin region.

The imaging apparatus described above with reference to FIG. 1 is preferentially used together with a resection device for performing open surgery, whereas the resection apparatus with the imaging apparatus and the resection device shown in FIG. 8 is preferentially used for minimally invasive surgery.

Figure 11:
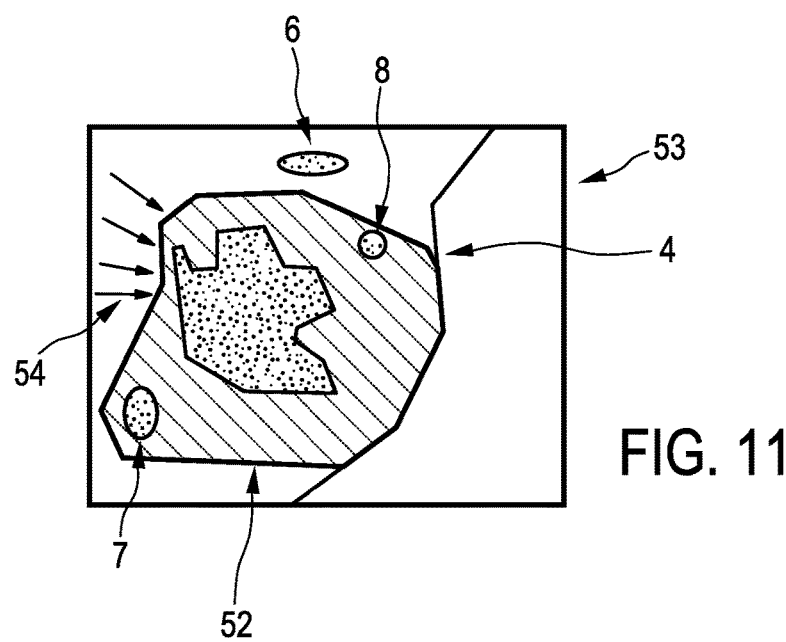
FIG. 11 shows schematically and exemplarily arrows for indicating a smallest margin region in the first image with the overlayed resection opening.

In particular, it is kept track of the location, where the surgical tool is arranged and where it has resected tissue, wherein this tool tracking information is visualized on the display unit 14, in particular, within the image indicating the smallest margin region as shown in FIG. 11. The probing function and the surgical function are integrated into a single tool, wherein the probe functionality of the tool could be activated, if the tool approaches suspicious areas as indicated in the image, which shows the smallest margin region, i.e., for instance, in the overview image shown in FIG. 11. In order to determine whether the tool has reached the adjacent region being adjacent to the smallest margin region, the known location of the surgical tool, which is known from the tool tracking information, and the known position of the adjacent region, which is shown in the overview image, can be used, wherein the location of the surgical tool can be shown within the overview image.

For tracking the surgical tool the resection apparatus further comprises a surgical tool tracking unit 29. In this embodiment, the surgical tool tracking unit 29 is adapted to perform an electromagnetic tracking, wherein the surgical tool tracking unit 29 cooperates with corresponding electromagnetic localization elements provided at or close to the tip 21 of the surgical tool 22. The surgical tool tracking unit 29 and the corresponding elements on the surgical tool form preferentially the PercuNav system of the company Philips. Also other known tracking systems can be used for tracking the location of the surgical tool, in particular, of the tip of the surgical tool, within the person.

Also the imaging apparatus described above with reference to FIG. 1 can comprise such a tool tracking system for tracking the position of the probe 15, in particular, of the tip of the probe 15, wherein the tracked probe 15 can be displayed on the display unit 14 together with the second image showing the resected part.

Figure 12:
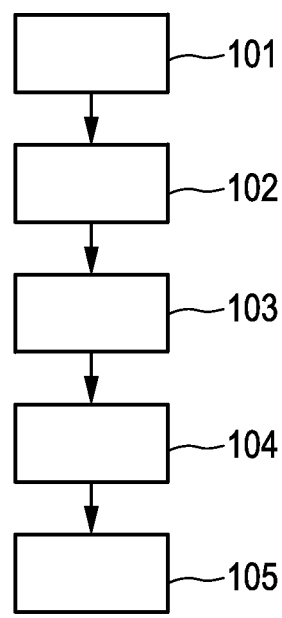
FIG. 12 shows a flowchart exemplarily illustrating an embodiment of a resection method for resecting an object.

In the following, a resection method for performing a resection procedure will exemplarily be described with reference to a flowchart shown in FIG. 12.

In step 101, a first image showing a region of an object being, in this embodiment, a person is provided, wherein the first image includes a resection part to be resected by a first resection procedure. The image is provided by a first image providing unit. In step 102, a second image providing unit provides a second image showing the region of the object, after the resection procedure has been performed, or showing a resected part, which has been resected, of the object. In step 103, a registration unit registers the first image and the second image with respect to each other, and, in step 104, a smallest margin determination unit determines a smallest margin region being a region where a margin between the resection part and the resected part is smallest based on the registered first and second images. In step 105, a display unit displays the determined smallest margin region, and, in step 106, an object type determination unit probes the smallest margin region or an adjacent region, wherein the adjacent region was adjacent to the smallest margin region before the first resection procedure has been performed, and determines whether the probed part contains cancerous tissue or not. In step 107, the adjacent region is resected in a second resection procedure by using a resection device, if it has been determined that the smallest margin region contains cancerous tissue.

Steps 101 to 106 can be regarded as being steps of an imaging method.

In the field of oncology, it is important to be able to discriminate tumor tissue from normal tissue. Golden standard is to inspect tissue at the pathology department after a biopsy or after surgical resection. A drawback of this current way of working is that real-time feedback during the procedure of taking a biopsy or performing the surgical resection is missing. Especially in the field of tumor resection, the feedback to the surgeon during the procedure would be important. Currently, the surgeon has to rely on pre-operative images that he/she should translate mentally to the patient in front of him/her to guess the shape of the tumor. Based on this knowledge, the decision is made, which part of the tissue has to be resected. This procedure can lead to situations, where the tumor is not completely removed.

The embodiments of the imaging apparatus and imaging method described above allow probing the outside of a resected tumor specimen in a sufficiently short time. Moreover, the measured potentially positive resection margin can be linked to the location in the patient such that the surgeon knows, where to further remove the tissue in order to completely remove the tumor. In particular, in order to determine whether the tumor has been completely removed, it is not necessary to probe the entire tissue specimen, but it is sufficient to probe only those areas that after image analysis are suspicious by using pre-operative information, i.e. it is sufficient to probe the determined smallest margin region of the tissue specimen.

The smallest margin region determination unit can further be adapted to provide a margin threshold and to determine further regions, where the margin between the resection part and the resected part is smaller than the provided margin threshold. The margin threshold may be provided depending on the kind, in particular, the tissue type, of the resection part. For instance, if the resection part is a breast tumor, the provided margin threshold may be about 2 mm. If the resection part is a lung tumor, the margin threshold may be equal to the size of the lung tumor, i.e. for a lung tumor having a diameter of 1 cm the margin threshold is preferentially about 1 cm. Also these further regions can be shown on a display unit and they can be probed by an object type determination device. In particular, it can be determined whether these further regions contain cancerous tissue or not and, if they contain cancerous tissue, also these further regions can be highlighted on the display unit and resected.

In particular, the first image providing unit is preferentially adapted to provide a computed tomography image of the patient, wherein in the computed tomography image a tumor is visible. Tumor segmentation is well-known and can be exploited to determine the outline of the tumor in the computed tomography image. The segmented tumor can be regarded as being the resection part. Then, the tumor will be resected by, for instance, open surgery in a first resection procedure. After the resection, the resected tissue specimen, i.e. the resected part, is being imaged by, for instance, a three-dimensional ultrasound imaging unit, which can be the second image providing unit. The generated ultrasound image is preferentially the second image. The first and second images are registered with respect to each other, where in a resulting combined image the distance between the outer boundary of the resected tissue, i.e. of the resected part, relative to the boundary of the tumor, i.e. the resection part, can be determined. The smallest margin determination unit can then determine those areas, where the distance between the boundary of the resected tissue and the boundary of the segmented tumor is the smallest and where the distance between the boundary of the resected tissue and the boundary of the segmented tumor is smaller than a provided distance threshold, i.e. smaller than a provided margin threshold. These areas can be indicated in the combined image by, for instance, arrows. They can then be probed for determining whether these areas contain cancerous tissue or not, i.e. for determining whether the tumor has been resected completely or not. For registering the first and second images markers can be used, which may be introduced into the tissue that will be resected, and which are visible in the first and second images.

Although above certain methods for determining the smallest margin region, which are performed by the smallest margin region determination unit, have been described, the smallest margin region determination unit can also be adapted to use other methods for determining a smallest margin region being a region that includes the smallest margin and optionally also further parts of the margin being adjacent to the smallest margin.

Although FIG. 1 only shows an imaging apparatus, this imaging apparatus can also be combined with a resection device, in particular, with an open surgery resection device, for performing the first resection procedure and the optional second resection procedure, wherein the combination of the imaging apparatus and the resection device can be regarded as being a resection apparatus.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Operations like the provision of the images, the registration, the determination of a smallest margin region, et cetera performed by one or several units or devices can be performed by any other number of units or devices. For example, steps 103 and 104 can be performed by a single unit or by any other number of different units. These operations and/or the control of the imaging apparatus in accordance with the imaging method and/or the control of the detection apparatus in accordance with the detection method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an imaging apparatus, wherein first and second image providing units provide a first image showing a region of an object, which includes a resection part to be resected, and a second image showing the region of the object, after the resection procedure has been performed, or showing a resected part, which has been resected. A smallest margin determination unit determines a smallest margin region being a region where a margin between the resection part and the resected part is smallest based on the first and second images. The smallest margin region is the region which most likely contains a part of the object, which should have been resected, like a cancerous part. An optionally following investigation of the resected part or of the remaining object can be more focused by considering this region, thereby allowing for faster corresponding assessing procedures.

The invention claimed is:

1. An imaging apparatus comprising:
   a first processor for providing a first computer tomography image, a first magnetic resonance image, a first positron emission tomography image, a first single photon emission computed tomography image, or a first ultrasound image, showing a pre-operational, pre-interventional, or pre-resectional image containing a biological tissue region in a subject, said first image of said biological tissue region including a resection region containing a resection part to be resected by a first resection procedure, wherein said first image includes an outer border of the resection part,
   a second processor for providing a second computer tomography image, a second magnetic resonance image, a second positron emission tomography image, a second single photon emission computed tomography image, or a second ultrasound image, showing a post-operational, post-interventional or post-resectional image of said biological tissue region of the subject after the first operation, intervention or resection procedure has been performed and a resected part containing said resection part, has been removed from the biological tissue region, or showing the resected part containing said resection part after it has been resected and removed from said biological tissue region, wherein said second image includes an outer border of said resected part,
   a registration processor for registering said first image and said second image with respect to each other, wherein the registration processor is adapted to display registration results in a combination image wherein said first image and said second image are overlayed,
   a smallest margin processor for determining from said combination image and/or from said second image of said resected part after resection, a smallest margin region, said smallest margin region being an image region within said resected part where a margin between the resection part and an outer boundary of the resected part is smallest, and/or a region adjacent to said resected part prior to resection, wherein said smallest margin region is determined by;
   a. measuring the margin between the resection part and said outer boundary of said resected part and determining where said margin is smallest, and
   b. based on said combination image, determining a region in said biological tissue region that was adjacent to the smallest margin determined in said resected part before the first resection procedure was performed,
   an apparatus for displaying the determined smallest margin region in at least one of the first and second images, and
   a tissue type determination device, for probing the smallest margin region within the resected part, determined by the smallest margin processor, and said adjacent region, wherein the tissue type determination device is adapted to determine the type of biological tissue in the probed region.

2. The imaging apparatus of claim 1, wherein
   said outer border of the resection part included in said first image is detectable by segmentation,
   said outer border of the resected part included in said second image is detectable by segmentation, and
   said smallest margin region is determined by determining the margin between the outer border of the resection part and the outer border of the resected part, and determining the region where the determined margin is smallest.

3. The imaging apparatus of claim 1, wherein said tissue type determination device is adapted for probing a part of the smallest margin region in said resected part and or a part of said adjacent region, to determine the type of the biological tissue in said smallest margin region of said resected part and said adjacent region.

4. The imaging apparatus of claim 3, wherein said subject is a person and the resection region is biological tissue, wherein the tissue type determination device is adapted to determine whether the biological tissue in said smallest margin region of said resected part and said adjacent region, is cancerous in the resected part and the adjacent region.

5. The imaging apparatus of claim 4, wherein the display apparatus displays the resected part and the adjacent region, and wherein the display apparatus is adapted to highlight said smallest margin region of said resected part and said adjacent region if it has been determined that the resected part or the adjacent region comprises cancerous tissue.

6. The imaging apparatus of claim 3, wherein the tissue type determination device and the second image providing processor form an integrated unit such that the integrated unit is adapted to provide the second image and to probe at least one of the smallest margin region and the adjacent region.

7. The imaging apparatus of claim 1, wherein the smallest margin region determination processor is adapted to provide a margin threshold and to determine further regions where the margin between the resection part and the resected part is smaller than the provided margin threshold.

8. A resection apparatus for performing a resection procedure, the resection apparatus comprising:
   a first processor for providing a first computer tomography image, a first magnetic resonance image, a first positron emission tomography image, a first single photon emission computed tomography image, or a first ultrasound image showing a pre-operational, pre-interventional, or pre-resectional image containing a biological tissue region in a subject, said first image of said biological tissue region including a resection region containing a resection part to be resected by a first resection procedure, wherein said first image includes an outer border of the resection part,
   a second processor for providing a second computer tomography image, a second magnetic resonance image, a second positron emission tomography image, a second single photon emission computed tomography image, or a second ultrasound image showing a post-operational, post-interventional or post-resectional image of said biological tissue region of the subject after the first operation, intervention or resection procedure has been performed, and a resected part containing said resection part, has been removed from the biological tissue region, or showing the resected part containing said resection part after it has been resected from said biological tissue region, wherein said second image includes an outer border of said resected part, a registration processor for registering the first image and the second image with respect to each other, wherein the registration processor is adapted to display registration results in a combination image, a smallest margin processor for determining from said combination image and/or from said second image of said resected part after resection, a smallest margin region, said smallest margin region being an image region within said resected part where a margin between the resection part and an outer boundary of the resected part is smallest, and/or a region adjacent to said resected part prior to resection, wherein said smallest margin region is determined by;

a. measuring the margin between the resection part and said outer boundary of said resected part and determining where said margin is smallest, and b. based on said combination image, determining a region in said biological tissue region that was adjacent to the smallest margin determined in said resected part before the first resection procedure was performed, an apparatus for displaying the determined smallest margin region in at least one of the first and second images, a tissue type determination device, for probing the smallest margin region within the resected part, determined by the smallest margin processor, and said adjacent region, wherein the tissue type determination device is adapted to determine the type of biological tissue in the probed regions, and a resection device for resecting the adjacent region in a second resection procedure depending on the determined type of the biological tissue in the probed region.

9. The resection apparatus of claim 8, wherein the tissue type determination device is adapted to determine whether the biological tissue is cancerous in the probed region, and wherein the resection device is adapted to resect the adjacent region, if it has been determined that the probed region comprises cancerous tissue.

10. The resection apparatus of claim 9, wherein the tissue determination device and the resection device form an integrated device such that the integrated device is adapted to probe a part of the adjacent region, and to resect the adjacent region, if it is determined that biological tissue in the probed part of the adjacent region comprises cancerous tissue.

11. A method of determining biological tissue type in a subject, comprising:

obtaining a first image comprising a first computer tomography image, a first magnetic resonance image, a first positron emission tomography image, a first single photon emission computed tomography image, or a first ultrasound image, showing a pre-operational, pre-interventional or pre-resectional biological tissue region of a subject, said first image of said biological tissue region including a resection region containing a resection part to be resected by a first resection procedure, from a first image providing processor, wherein said first image includes an outer border of said resection part, obtaining a second image comprising a second computer tomography image, a second magnetic resonance image, a second positron emission tomography image, a second single photon emission computed tomography image, or a second ultrasound image showing a post-operational, post interventional or post-resectional image of said biological tissue region of the subject, after the first operation, intervention or resection procedure has been performed and a resected part containing said resection part, has been removed from said biological tissue region, or showing the resected part containing said resection part after it has been resected and removed from the biological tissue region, from a second image providing processor, wherein said second image includes an outer border of said resected part, registering said first image and said second image with respect to each other by a registration processor adapted to display registration results in a combination image, determining from said combination image or from said second image of said resected part after resection, a smallest margin region, said smallest margin region being a region within said resected part where a margin between the resection part and an outer boundary of the resected part is smallest, wherein said smallest margin region is determined by;

a. measuring the margin between the resection part and said outer boundary of said resected part and determining where said margin is smallest, and b. based on said combination image, determining a region in said biological tissue region that was adjacent to the smallest margin determined in said resected part before the first resection procedure was performed, displaying the smallest margin region in at least one of said first and second images by a display apparatus, and probing said smallest margin region, determined by the smallest margin determination unit, and said adjacent region, with a tissue type determination device adapted to determine the type of biological tissue in the probed regions.

12. A resection method for performing a second resection procedure, the second resection method comprising:

obtaining a first computer tomography image, a first magnetic resonance image, a first positron emission tomography image, a first single photon emission computed tomography image, or a first ultrasound image showing a pre-operational, or pre-interventional or pre-resectional biological tissue region of a subject, which includes said first image of said biological tissue region including a resection region containing a resection part to be resected by a first resection procedure, from a first image providing processor, wherein said first image includes an outer border of said resection part, obtaining a second computer tomography image, a second magnetic resonance image, a second positron emission tomography image, a second single photon emission computed tomography image, or a second ultrasound image showing a post-operational, post-intervention or post-resectional image of said biological tissue region of the subject after the first operation, intervention or resection procedure has been performed, and a resected part containing said resection part, has been removed from the said biological tissue region, or showing the resected part containing said resection part after it has been resected and removed from the biological tissue region, from a second image providing processor, wherein said second image includes an outer border of the resected part, registering said first image and said second image with respect to each other by a registration processor adapted to display said registration results in a combination image, determining from said combination image or from said second image of said resected part after resection, a smallest margin region, said smallest margin region being a region within said resected part where a margin between the resection part and an outer boundary of the resected part is smallest, wherein said smallest margin region is determined by;

a. measuring the margin between the resection part and said outer boundary of said resected part and determining where said margin is smallest, and b. based on said combination image, determining a region in said biological tissue region that was adjacent to the smallest margin determined in said resected part before the first resection procedure was performed, displaying the smallest margin region in at least one of said first and second images by a display apparatus, probing said smallest margin region, determined by the smallest margin determination unit, and said adjacent region, with a tissue type determination device adapted to determine the type of biological tissue in the probed regions, and resecting said adjacent region in a second resection procedure where the determined type of the biological tissue in the probed region is found to be cancerous, with a resection device.

13. An imaging computer program stored on a non-transitory computer-readable medium, characterized by program code means for causing an imaging apparatus as defined in claim 1 to carry out the steps of the imaging method, when the imaging computer program is run on a computer controlling the imaging apparatus.

14. A resection computer program stored on a non-transitory computer-readable medium for performing a resection procedure, wherein the resection computer program is characterized by program code means for causing a resection apparatus as defined in claim 8 to carry out the steps of the resection method, when the resection computer program is run on a computer controlling the resection apparatus.

15. The imaging apparatus of claim 1, wherein the second image shows the resected part which has been resected from the biological tissue region and contains the resection part.

16. The imaging apparatus of claim 15, wherein the second image shows said outer border of said resected part ex vivo.

17. The imaging apparatus of claim 1, wherein the first image is a computed tomography image and the second image is a three-dimensional ultrasound image.

* * * * *